US012090763B2

(12) United States Patent
Ito

(10) Patent No.: US 12,090,763 B2
(45) Date of Patent: Sep. 17, 2024

(54) HEAD CLEANING APPARATUS, INKJET RECORDING APPARATUS, HEAD CLEANING METHOD AND STORAGE MEDIUM

(71) Applicant: KONICA MINOLTA, INC., Tokyo (JP)

(72) Inventor: Yohei Ito, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 158 days.

(21) Appl. No.: 17/943,322

(22) Filed: Sep. 13, 2022

(65) Prior Publication Data

US 2023/0115268 A1 Apr. 13, 2023

(30) Foreign Application Priority Data

Oct. 12, 2021 (JP) ................................ 2021-167571

(51) Int. Cl.
*B41J 2/165* (2006.01)

(52) U.S. Cl.
CPC .. *B41J 2/16535* (2013.01); *B41J 2002/16573* (2013.01)

(58) Field of Classification Search
CPC .......... B41J 2/16535; B41J 2002/16573; B41J 2/16526; B41J 25/304; B41J 2002/1655; B41J 2/16508
USPC ........................................................ 347/22
See application file for complete search history.

(56) References Cited

U.S. PATENT DOCUMENTS

2002/0109745 A1* 8/2002 Barinaga .............. B41J 2/16535 347/31
2008/0266342 A1 10/2008 Steinfield et al.
2017/0066244 A1* 3/2017 Fujioka ................ B41J 2/16552
2020/0156380 A1* 5/2020 Hiroi .................... B41J 2/16535
2021/0299966 A1* 9/2021 Ito .......................... B29C 64/35

FOREIGN PATENT DOCUMENTS

JP 2005238611 A 9/2005
JP 5857969 B2 2/2016

OTHER PUBLICATIONS

Extended European Search Report dated Mar. 3, 2023, issued in corresponding European Application No. 22195352.4. (24 pages).

* cited by examiner

*Primary Examiner* — Jason S Uhlenhake
*Assistant Examiner* — Alexander D Shenderov
(74) *Attorney, Agent, or Firm* — Buchanan Ingersoll & Rooney PC

(57) ABSTRACT

A head cleaning apparatus includes a cleaning unit that includes a cleaning member and a hardware processor. The head cleaning apparatus is configured to perform a cleaning operation of cleaning a nozzle surface of an inkjet head with the cleaning member, the nozzle surface having a water-repellent film. The cleaning operation is performed either in a rub mode or a stamp mode. In the rub mode, the cleaning member and the nozzle surface are brought into contact and relatively slid on each other. In the stamp mode, the cleaning member and the nozzle surface are brought into contact and kept still. The hardware processor determines which mode is performed, the rub mode or the stamp mode, in the cleaning operation based on a predetermined condition.

17 Claims, 9 Drawing Sheets

HEAD CLEANING APPARATUS, INKJET RECORDING APPARATUS, HEAD CLEANING METHOD AND STORAGE MEDIUM

CROSS-REFERENCE TO RELATED APPLICATIONS

The entire disclosure of Japanese Patent Application No. 2021-167571 filed on Oct. 12, 2021 is incorporated herein by reference in its entirety.

BACKGROUND

Technological Field

The present disclosure relates to a head cleaning apparatus, an inkjet recording apparatus, a head cleaning method, and a storage medium.

Description of Related Art

A known inkjet recording apparatus records images by ejecting ink onto desired positions of a recording medium. When ejected ink adheres to the nozzle surface of the inkjet head, the ink remaining on the nozzle surface may thicken and solidify while blocking part of ink outlets of nozzles. This may cause poor ink ejection.

To remove ink remaining on the nozzle surface, a known head maintenance apparatus rubs the nozzle surface by relatively sliding a cloth and the nozzle surface on each other at a predetermined speed (for example, see Japanese patent No. 5857969). Such a head maintenance apparatus can remove the ink remaining on the nozzle surface.

SUMMARY

According to the invention of JP5857969B, the apparatus removes the remaining ink by uniformly rubbing the nozzle surface. The apparatus may therefore unnecessarily damage the water-repellent film formed on the nozzle surface, depending on the state of ink remaining on the nozzle surface. This may decrease the water-repellent property of the nozzle surface.

The present invention has been conceived in view of the above issue. Objects of the present invention include providing a head cleaning apparatus, an inkjet recording apparatus, a head cleaning method, and a storage medium that can appropriately remove ink remaining on the nozzle surface.

To achieve at least one of the abovementioned objects, according to an aspect of the present invention, there is provided a head cleaning apparatus including: a cleaning unit that includes a cleaning member; and a hardware processor, wherein the head cleaning apparatus is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the hardware processor determines which mode is performed, the rub mode or the stamp mode, in the cleaning operation based on a predetermined condition.

According to another aspect of the present invention, there is provided a head cleaning method for a head cleaning apparatus that includes a cleaning unit including a cleaning member and that is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the head cleaning method includes determining which mode is performed, the rub mode or the stamp mode, in the cleaning operation based on a predetermined condition.

According to another aspect of the present invention, a non-transitory computer readable storage medium storing a program for a computer of a head cleaning apparatus that includes a cleaning unit including a cleaning member and that is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the program causes the computer to determine which mode is performed, the rub mode or the stamp mode, in the cleaning operation based on a predetermined condition.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Figure 1:
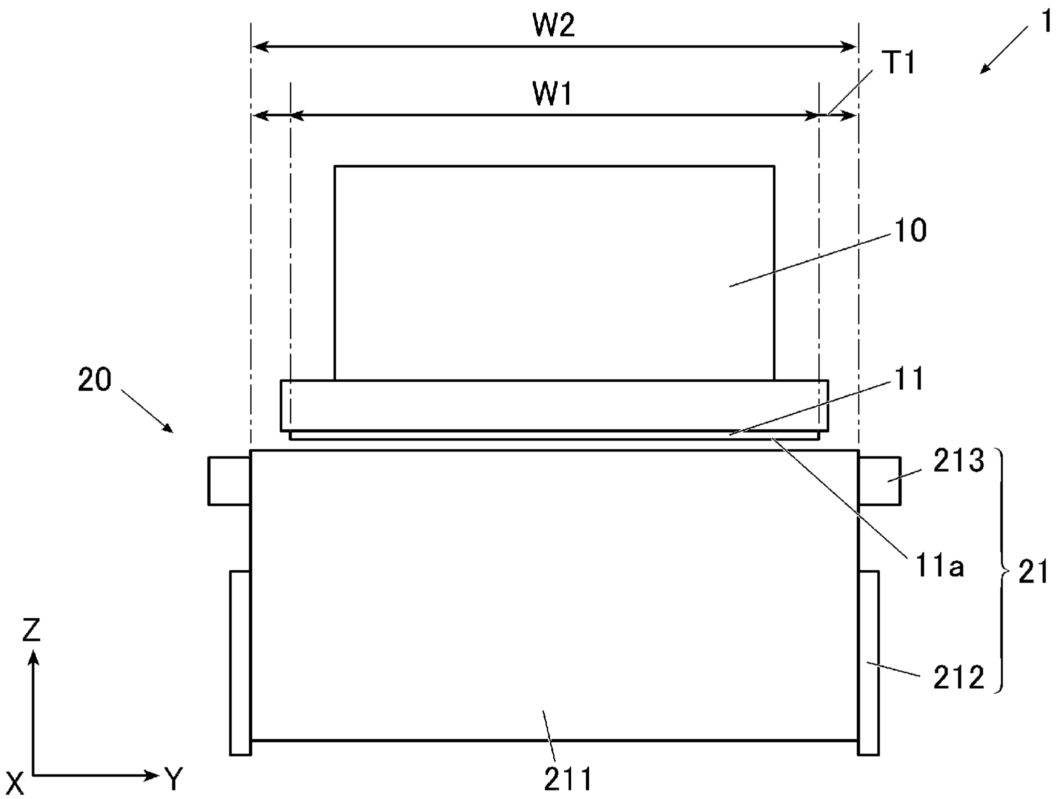
FIG. 1 is a front view of an inkjet head and a cleaning unit of an inkjet recording apparatus according to an embodiment of the present invention.

Hereinafter, a preferred embodiment of the present invention is described with reference to the drawings. However, the scope of the invention is not limited to the illustrated examples. In the following description, components having the same function and configuration are marked with the same reference numeral, and the description thereof is omitted.

In the following description, the direction in which a cleaning member 211 of a cleaning unit 21 is conveyed is the X direction, the direction orthogonal to the X direction on the conveyance surface of the cleaning member 211 is the Y direction, and the direction that is orthogonal to the X and Y directions and in which ink is ejected by an inkjet head 10 is the Z direction, as shown in the figures.

[Overview of Inkjet Recording Apparatus]

Figure 2:
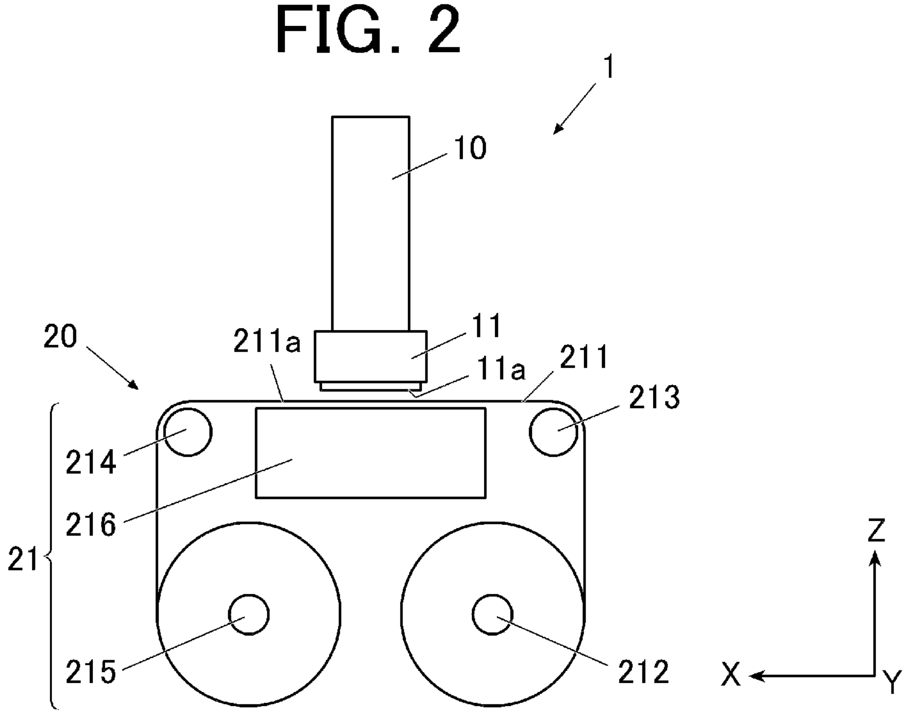
FIG. 2 is a lateral view of the inkjet head and the cleaning unit of the inkjet recording apparatus according to the embodiment of the present invention.

As shown in FIG. 1 and FIG. 2, an inkjet recording apparatus 1 includes an inkjet head 10 and a head cleaning apparatus 20.

(Inkjet Head)

The inkjet head 10 ejects ink from nozzles to print letters or form images on recording media, such as paper or fabric. The nozzles of the inkjet head 10 have openings that are arranged in the Y direction on the nozzle surface 11*a* of the nozzle plate 11.

The nozzle surface 11*a* is coated with a water-repellent film (ink-repellent film). As the water-repellent film, an organic film made of fluororesin may be mainly used. By coating the nozzle surface 11*a* with the water-repellent film, the ink is less adhesive to the nozzle surface 11*a*.

(Head Cleaning Apparatus)

The head cleaning apparatus 20 includes a cleaning unit 21 that has a cleaning member 211 for cleaning (wiping) the nozzle surface 11*a*. The head cleaning apparatus 20 holds the cleaning surface 211*a* of the cleaning member 211 such that the cleaning surface 211*a* is parallel with the X-Y plane that is parallel with the nozzle surface.

[Cleaning Member]

In this embodiment, the cleaning member 211 is a long material rolled into a roll. For example, the cleaning member 211 may be woven/nonwoven fabric or paper. The cleaning member 211 is unwound by the unwinding roller 215 and stretched between the supporting rollers 213, 214, thereby forming a cleaning surface 211*a* at a predetermined position. After cleaning the nozzle surface 11*a*, the cleaning surface 211*a* to which ink adheres is wound up by the winding roller 212. At the back surface of the cleaning surface 211*a*, a backup member 216 is disposed. The backup member 216 consists of rubber or sponge, for example, to stand against the pushing force of the nozzle surface 11*a* to the cleaning surface 211*a*.

Figure 3:
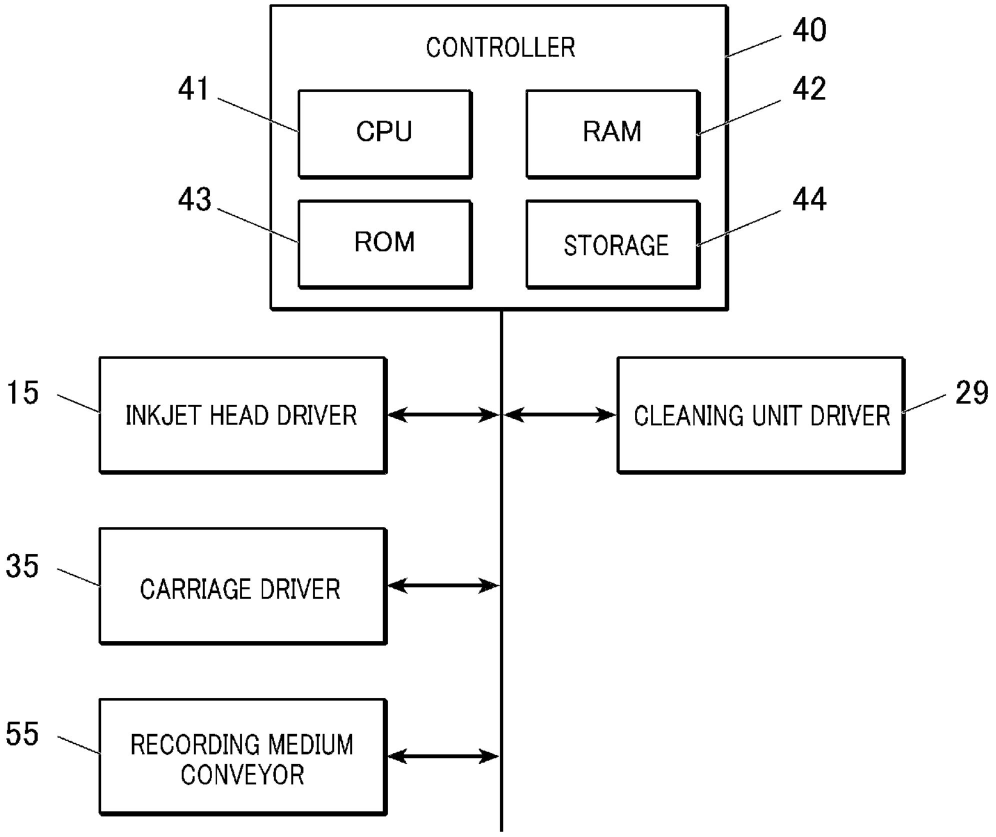
FIG. 3 is a block diagram showing main functional components of the inkjet recording apparatus according to the embodiment of the present invention.

FIG. 3 shows a block diagram showing main functional components of the inkjet recording apparatus 1.

The inkjet recording apparatus 1 includes a controller 40 (hardware processor, determination unit), an inkjet head driver 15, a cleaning unit driver 29, a carriage driver 35, and a recording medium conveyor 55, as shown in FIG. 3. The controller 40 sends signals to the respective drivers to control their driving.

[Controller]

The controller 40 is a processor that centrally controls the overall operation of the inkjet recording apparatus 1. The controller 40 includes a central processing unit (CPU) 41, a random access memory (RAM) 42, a read only memory (ROM) 43, and a storage 44.

[CPU]

The CPU 41 reads out control programs and setting data stored in the ROM 43 or the storage 44, causes the RAM 42 to store the read-out programs and data, and executes the programs to drive and control the inkjet recording apparatus 1 and to perform various arithmetic processes.

[RAM]

The RAM 42 provides the CPU 41, which performs various control operations, with a working memory space and stores temporary data. The RAM 42 may include a non-volatile memory.

[ROM]

The ROM 43 stores various control programs to be executed by the CPU 41, setting data, and so forth. Instead of the ROM 43, a rewritable nonvolatile memory (e.g. flash memory) may be used.

[Storage]

The storage 44 consists of a hard disk drive (HDD). Along with the HDD, a dynamic random access memory (DRAM) may also be used. The storage 44 stores programs to be executed by the CPU 41, print jobs (image recording instructions), image data of images to be recorded in accordance with the print jobs, an operating system (OS), and various kinds of print data related to determination conditions to be described later.

[Inkjet Head Driver]

In accordance with the control signals sent from the controller 40, the inkjet head driver 15 sends driving signals to the inkjet head 10 so that the nozzles appropriately eject ink.

[Cleaning Unit Driver]

In accordance with the control signals sent from the controller 40, the cleaning unit driver 29 outputs driving signals to a motor or a brake of a moving mechanism that moves the cleaning unit 21 so that the cleaning unit 21 is moved to a position facing the inkjet head 10, which is the target of the cleaning operation.

[Carriage Driver]

In accordance with the control signals sent from the controller 40, the carriage driver 35 outputs driving signals to a motor or a brake of a moving mechanism that moves the inkjet head 10 so that the inkjet head 10 is moved to a position facing the recording medium or to a position facing the cleaning unit 21.

[Recording Medium Conveyor]

In accordance with the control signals sent from the controller 40, the recording medium conveyor 55 conveys the recording medium to the conveyance path that faces the inkjet head 10.

The inkjet head 10 mounted on the carriage is movable in the Y direction. The controller 40 controls the inkjet head driver 15, the carriage driver 35, and the recording medium conveyor 55 to perform the recording operation on the recording medium.

On the other hand, when the cleaning operation is performed on the nozzle surface 11*a*, the controller 40 stops the recording operation. The controller 40 controls the carriage driver 35 and the cleaning unit driver 29 to dispose the inkjet head 10 at the cleaning position, as shown in FIG. 1 and FIG. 2, and to bring the nozzle surface 11*a* and the cleaning surface 211*a* into contact. The contact between the nozzle surface 11*a* and the cleaning surface 211*a* is achieved by the lifting-lowering function of the carriage by the carriage driver 35 or by the lifting-lowering function of the cleaning unit 21 by the cleaning unit driver 29.

[Cleaning Operation]

The cleaning unit 21 of the inkjet recording apparatus 1 performs the cleaning operation on the nozzle surface 11*a* in a rub mode or a stamp mode. Hereinafter, these modes are described.

In FIGS. 4B, 4C, 5B and 5C, the inkjet head 10 and the cleaning unit 21 are controlled to abut each other or separate from each other by lifting/lowering the cleaning unit 21. However, the abutting and separating may be achieved by lifting/lowering the carriage, as described above.

[Rub Mode]

The rub mode is a mode in which the nozzle surface 11*a* and the cleaning surface 211*a* are brought into contact and relatively slid on each other.

Figure 4A:
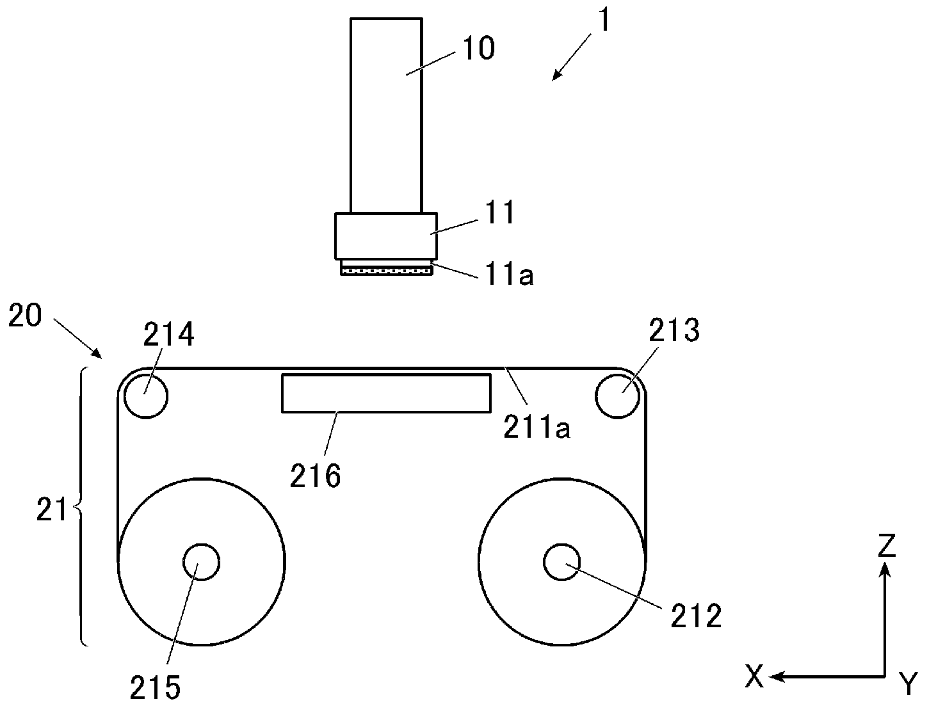
FIG. 4A is a lateral view of the inkjet head and the head cleaning apparatus in part of motion in a rub mode.
Figure 4B:
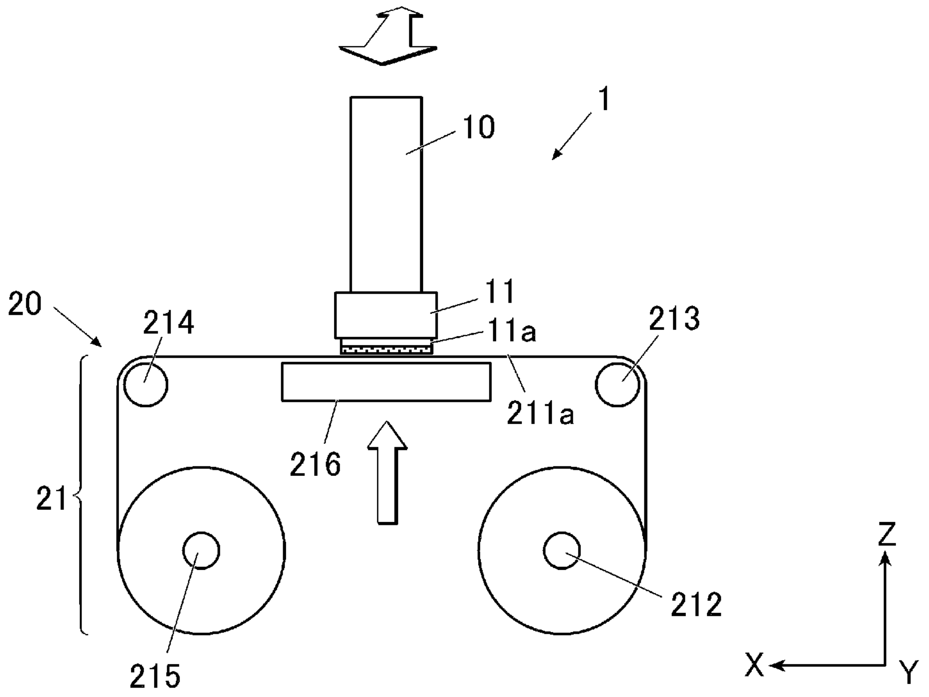
FIG. 4B is a lateral view of the inkjet head and the head cleaning apparatus in part of motion in the rub mode.
Figure 4C:
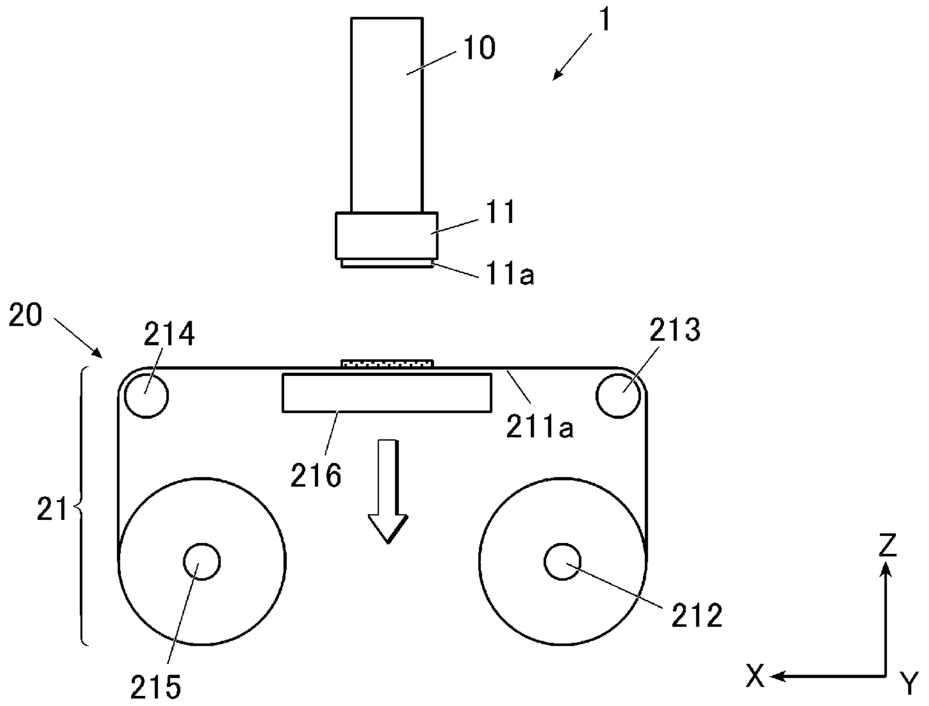
FIG. 4C is a lateral view of the inkjet head and the head cleaning apparatus in part of motion in the rub mode.
Figure 4D:
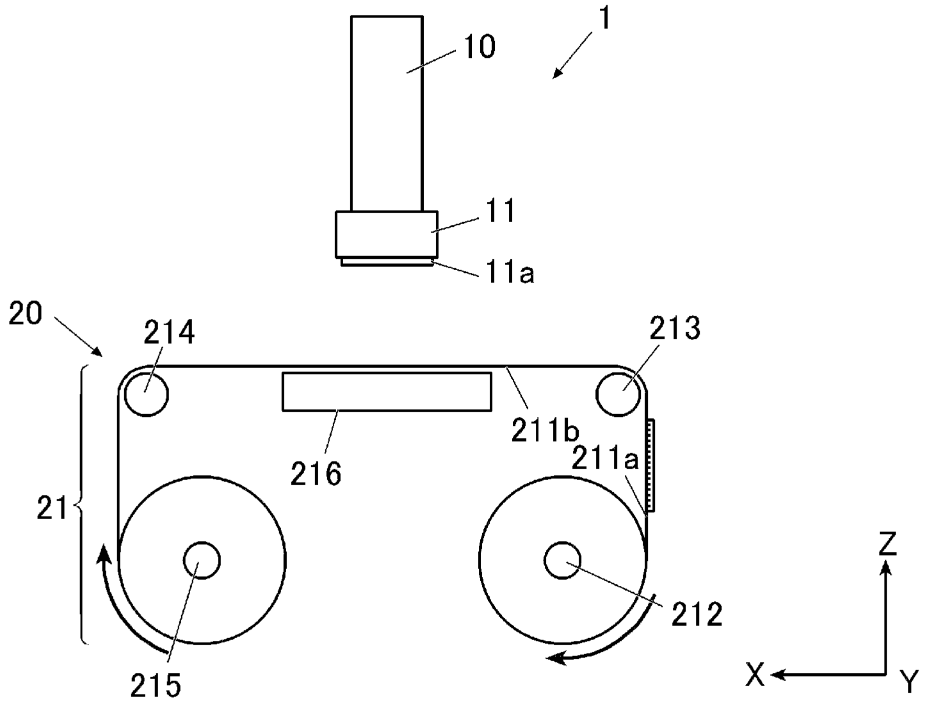
FIG. 4D is a lateral view of the inkjet head and the head cleaning apparatus in part of motion in the rub mode.

Specifically, as shown in FIG. 4A, in a state where the inkjet head 10 and the cleaning unit 21 are separate from each other, the controller 40 controls the carriage driver 35 or the cleaning unit driver 29 to bring the nozzle surface 11*a* and the cleaning surface 211*a* into contact, as shown in FIG. 4B and to perform the sliding motion. In the sliding motion, the inkjet head 10 or the cleaning unit 21 is reciprocated in the Y direction. By the sliding, the ink adhering to the nozzle surface 11*a* is removed. After the sliding motion, the controller 40 separates the nozzle surface 11*a* and the cleaning surface 211*a* as shown in FIG. 4C. The controller 40 then drives the unwinding roller 215 and the winding roller 212 as shown in FIG. 4D to wind up the ink-adhered cleaning surface 211*a* and set a new cleaning surface 211*b*.

By the rub mode, a thickened or further solidified ink that has adhered to the nozzle surface 11*a* for a certain period of time may be removed. Further, when the cleaning member 211 is a woven fabric, the cleaning member 211 can remove small ink droplets present in small spaces between warps and wefts.

On the other hand, the sliding motion may damage (scratch) the water-repellent film of the nozzle surface 11*a* and decrease the water-repellent property of the film.

[Stamp Mode]

Figure 5A:
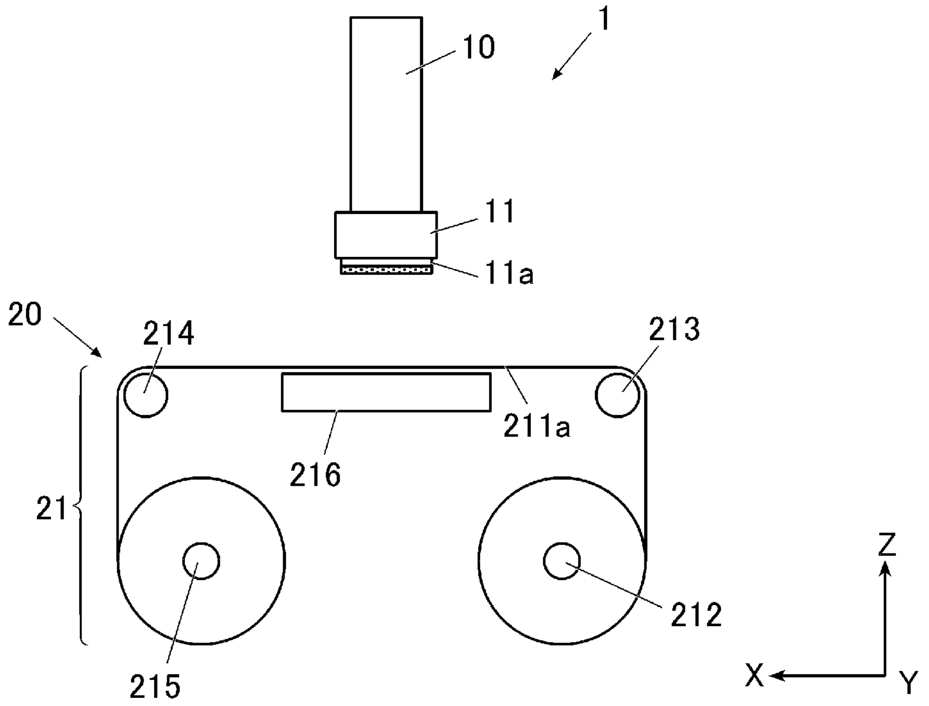
FIG. 5A is a lateral view of the inkjet head and the head cleaning apparatus in part of motion in a stamp mode.
Figure 5B:
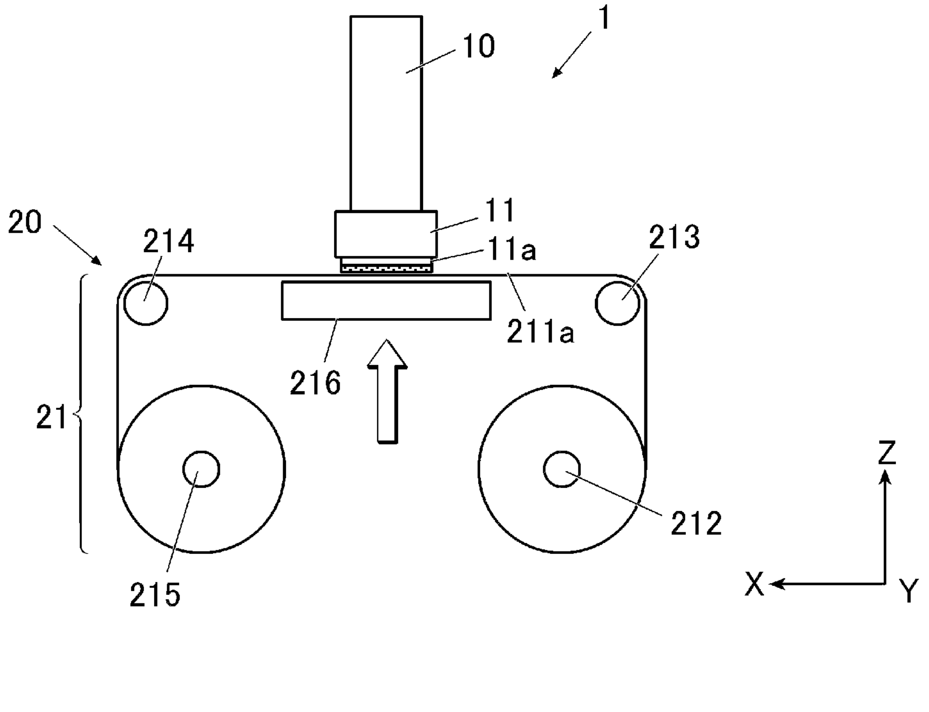
FIG. 5B is a lateral view of the inkjet head and the head cleaning apparatus in part of motion in the stamp mode.
Figure 5C:
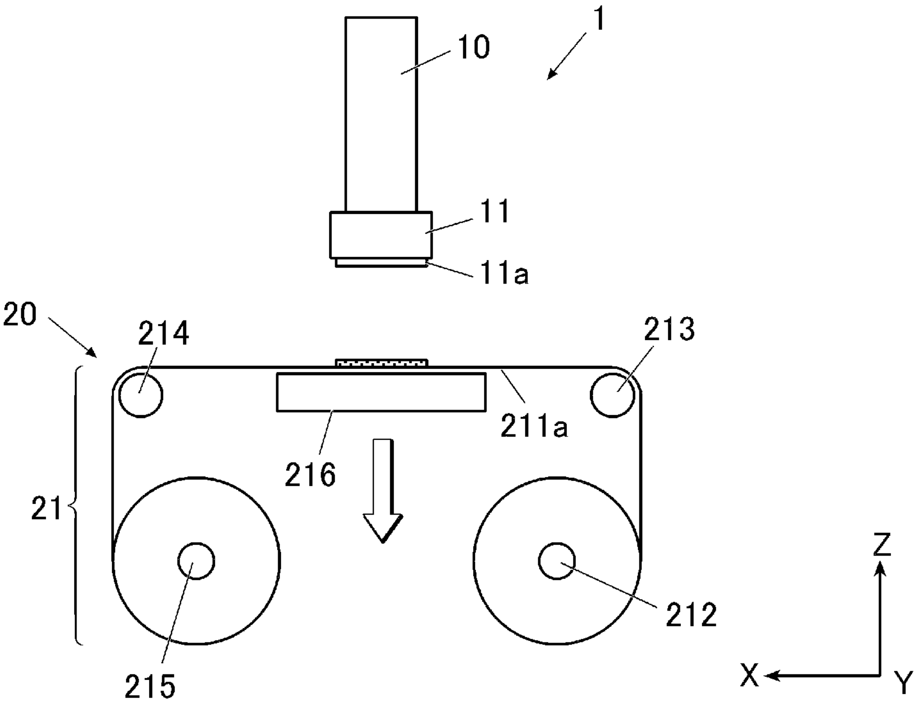
FIG. 5C is a lateral view of the inkjet head and the head cleaning apparatus in part of motion in the stamp mode.
Figure 5D:
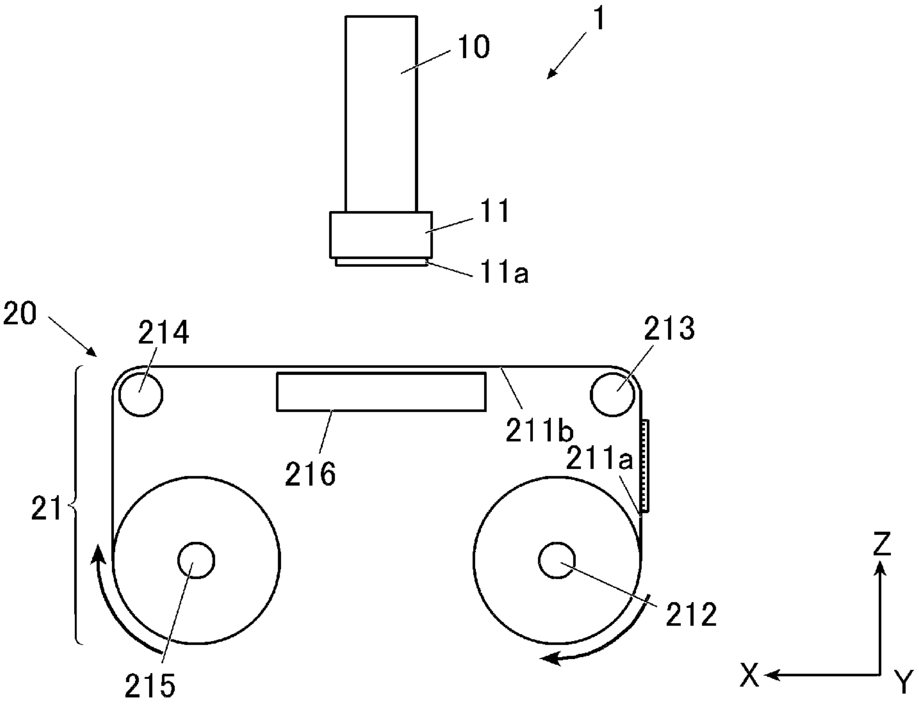
FIG. 5D is a lateral view of the inkjet head and the head cleaning apparatus in part of motion in the stamp mode.

The stamp mode is a mode where the nozzle surface 11*a* and the cleaning surface 211*a* are kept still while being in contact with each other. The stamp mode is different from the rub mode in that, after the controller 40 brings the nozzle surface 11*a* and the cleaning surface 211*a* into contact as shown in FIG. 5B, the controller 40 does not perform the sliding motion in the Y direction but keeps the nozzle surface 11*a* and the cleaning surface 211*a* still, and then separates the nozzle surface 11*a* and the cleaning surface 211*a* as shown in FIG. 5C.

Unlike the rub mode, the stamp mode does not relatively slide the nozzle surface 11*a* and the cleaning member 211 on each other. Therefore, a thickened or further solidified ink may not be sufficiently removed as compared with the rub mode. When the cleaning member 211 is a woven fabric, small ink droplets present in small spaces between warps and wefts may not be fully removed.

On the other hand, since the stamp mode does not perform the sliding motion, the stamp mode does not damage the water-repellent film that covers the nozzle surface 11*a* in removing the remaining ink as compared with the rub mode. When a large amount of ink adheres to the nozzle surface 11*a* and the rub mode is performed for removing the ink, the ink may return into the nozzles. The stamp mode, on the other hand, can appropriately remove the ink.

Therefore, it is preferable that the cleaning operation be performed in the rub mode when small ink droplets or thickened ink adhere to the nozzle surface 11*a*, for example.

On the other hand, it is preferable that the cleaning operation be performed in the stamp mode when large ink droplets or ink having a relatively low viscosity adhere to the nozzle surface 11*a*, for example.

In the inkjet recording apparatus 1 of this embodiment, the controller 40 functions as a determination unit that determines which mode is performed, the rub mode or the stamp mode, in the cleaning operation, on the basis of the determination condition(s) as described below. The head cleaning apparatus 20 therefore can appropriately remove the ink adhering to the nozzle surface 11*a*.

[Determination Conditions]

(Condition 1: Time Elapsed Since the Last Cleaning Operation)

An example of the determination condition is the time elapsed since the time at which the last cleaning operation is performed.

Figure 6:
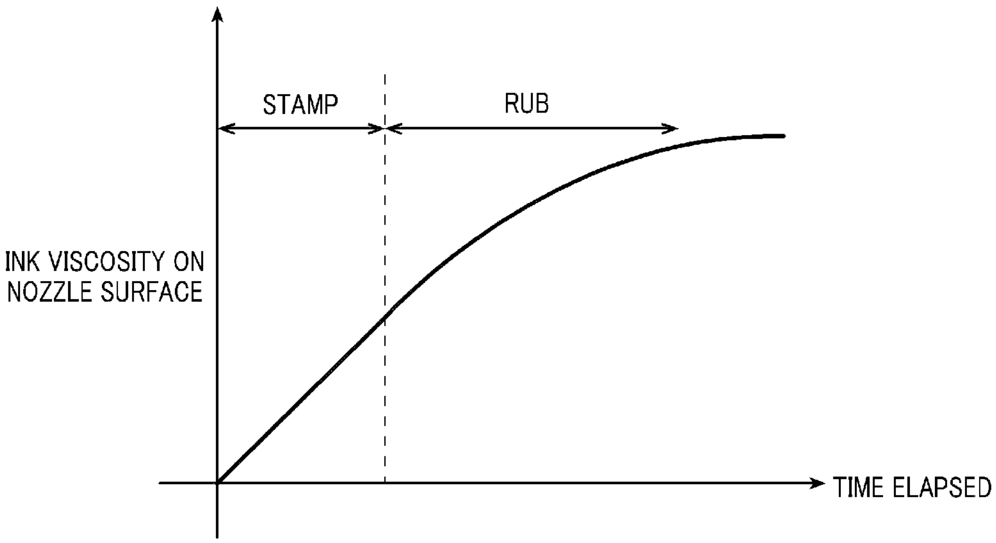
FIG. 6 is a graph showing the relation between the time elapsed since ink adhesion to the nozzle surface and the ink viscosity.

FIG. 6 is a graph showing the relation between the time elapsed since ink adhered to the nozzle surface 11*a* and the viscosity of the adhering ink. As shown in FIG. 6, the viscosity of ink adhering to the nozzle surface 11*a* increases as time elapses. This is because discharge products adhere to the ink and the ink becomes dry as time elapses.

Therefore, if the time elapsed since the time at which the last cleaning operation is performed is three hours or longer, the controller 40 as the determination unit determines to perform the cleaning operation in the rub mode. If the elapsed time is shorter than three hours, the controller 40 determines to perform the cleaning operation in the stamp mode. Thus, the ink adhering to the nozzle surface 11*a* can be appropriately removed.

(Condition 2: Components of Ink)

The determination condition may be related to the components of ink ejected from the nozzles.

For example, the average diameter of titanium oxide ($TiO_2$) as a pigment of white ink is 180 to 300 nanometers and is greater than the average diameter of pigments of YMCK inks that is 50 to 150 nanometers. Further, carbon black (CB) as a pigment of black ink is harder than the pigments of YMCK inks. When the ink containing such pigments adheres to the nozzle surface 11*a*, the rub mode is likely to damage the water-repellent film covering the nozzle surface 11*a*.

Therefore, when the ink ejected from the nozzle surface 11*a* contains titanium oxide or carbon black, for example, the controller 40 as the determination unit determines to perform the cleaning operation in the stamp mode. On the other hand, when the ink does not contain titanium oxide or carbon black, the controller 40 determines to perform the cleaning operation in the rub mode. Thus, the ink adhering to the nozzle surface 11*a* can be appropriately removed.

(Condition 3: Whether a Predetermined Period of Time has Elapsed Since Purging or Not?)

The determination condition may be related to whether the cleaning operation is performed within a predetermined period of time since purging. Although the predetermined period of time may be determined as desired, it is preferable the predetermined period of time be short (right after purging).

Right after purging, a large amount of ink adheres to the nozzle surface 11*a*. When the rub mode is performed on such a nozzle surface 11*a*, the water-repellent film that covers the nozzle surface 11*a* may be damaged.

Therefore, if the cleaning operation is performed within a predetermined period of time since purging, the controller 40 as the determination unit determines to perform the cleaning operation in the stamp mode. If the cleaning operation is performed after the predetermined period of time since purging, the controller 40 determines to perform the cleaning operation in the rub mode. Thus, the ink adhering to the nozzle surface 11*a* can be appropriately removed.

(Condition 4: Statistic of Coverage)

The determination condition may be related to a statistic (s) of the coverage of the recording operation after the last cleaning operation.

Specifically, assume two cases in which the total printing time of the recording operation after the last cleaning operation is the same but the average coverage is greater in one case than in the other case. In the case having the greater average coverage, a more amount of ink adheres to the nozzle surface 11*a*. Therefore, for a greater coverage, the stamp mode is performed for removing ink so as not to damage the nozzle surface 11*a*, as shown in the Table I and Table II.

TABLE I

| | COVERAGE 10% PRINTING TIME (h) | | | |
|---|---|---|---|---|
| | 1 | 3 | 5 | 7 |
| CLEANING OPERATION | RUB | RUB | STAMP | STAMP |

TABLE II

| | COVERAGE 30% PRINTING TIME (h) | | | |
|---|---|---|---|---|
| | 1 | 3 | 5 | 7 |
| CLEANING OPERATION | RUB | STAMP | STAMP | STAMP |

That is, when the average coverage of the recording operation after the last cleaning operation is 30% or greater, the controller 40 as the determination unit determines to perform the cleaning operation in the stamp mode. On the other hand, when the average coverage is less than 30%, the controller 40 determines to perform the cleaning operation in the rub mode. Thus, the ink adhering to the nozzle surface 11*a* can be appropriately removed. The statistic of the coverage of the recording operation after the last cleaning operation, which is referred to by the controller 40, is not limited to the average but may be the mode, the median, or any known statistic.

(Condition 5: Total Printing Time)

The determination condition may be related to the total printing time of the recording operation since the last cleaning operation.

Specifically, assume two cases where the statistic of the coverage of the printing operation after the cleaning operation is the same but the total printing time is longer in one case than in the other case. In the case having the longer total printing time, a more amount of ink adheres to the nozzle surface 11*a*. Therefore, for a longer total printing time, the ink is removed by the stamp mode so as not to damage the nozzle surface 11*a*, as shown in the Table I and Table II.

For example, when the total printing time of the recording operation since the last cleaning operation is five hours or longer, the controller 40 as the determination unit determines to perform the cleaning operation in the stamp mode. When the total printing time is shorter than five hours, the controller 40 determines to perform the cleaning operation in the rub mode. Thus, the ink adhering to the nozzle surface 11*a* can be appropriately removed.

(Condition 6: Period of Time During which the Inkjet Head is Mounted)

The determination condition may be related to the period of time during which the inkjet head 10 is mounted.

Figure 7:
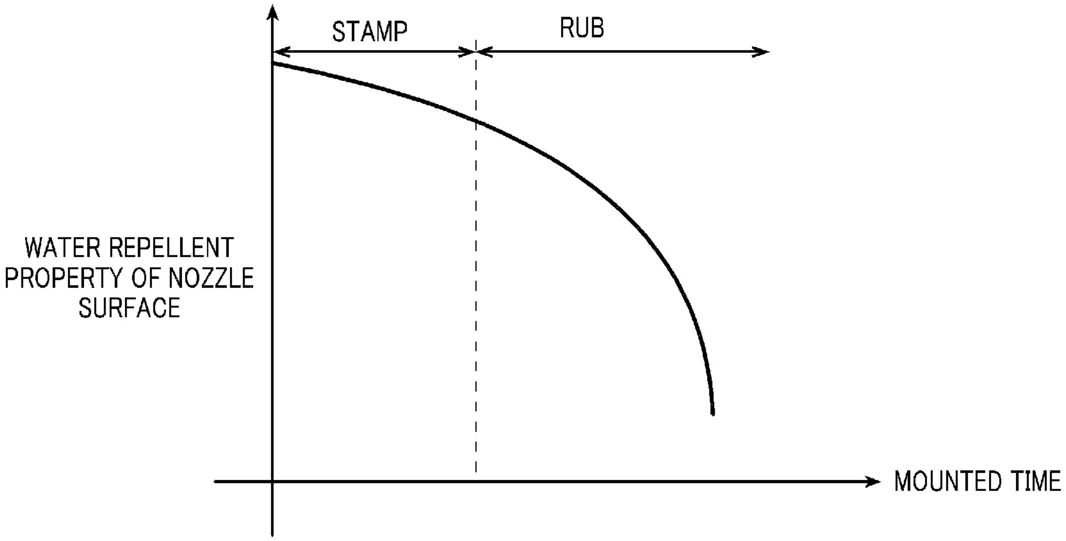
FIG. 7 is a graph showing the relation between the time during which the inkjet head is mounted and the water-repellent property of the nozzle surface.

FIG. 7 is a graph showing the relation between the period of time during which the inkjet head 10 is mounted and the water-repellent property of the nozzle surface 11*a*. As shown in FIG. 7, the longer the inkjet head 10 is mounted, the lower the water-repellent property of the nozzle surface 11*a* becomes. Therefore, the ink is more difficult to remove by the stamp mode when the inkjet head 10 has been mounted for a long time, even if the ink adheres to the nozzle surface 11*a* in the normal way. This is because the longer the inkjet head 10 is mounted, the more number of times of cleaning operation is performed in the rub mode and the water-repellent film receives more damage.

Therefore, for example, when the number of days elapsed since the date on which the inkjet head 10 is mounted is seven months or more, the controller 40 as the determination unit determines to perform the cleaning operation in the rub mode. When the number of days elapsed is less than seven months, the controller 40 determines to perform the cleaning operation in the stamp mode. Thus, the ink adhering to the nozzle surface 11*a* can be appropriately removed.

(Condition 7: Installation Angle of Inkjet Head)

The determination condition may be the installation angle of the inkjet head with respect to the horizontal plane when the inkjet head 10 is installed.

Specifically, when the installation angle is steep, the ink adhering to the nozzle surface 11*a* after ink ejection or purging drops from the nozzle surface 11*a* toward the top plate by gravity. Accordingly, a less amount of ink remains on the nozzle surface 11*a*, and the water-repellent film is less likely to be damaged. Therefore, when the installation angle is steep, the ink I s removed by the rub mode.

TABLE III

| INSTALLATION ANGLE (°) | 10 | 30 | 50 | 70 |
|---|---|---|---|---|
| CLEANING OPERATION | STAMP | STAMP | RUB | RUB |

For example, when the installation angle of the inkjet head 10 with respect to a horizontal plane at the time of installation is 50 degrees or greater, the controller 40 as the determination unit determines to perform the cleaning operation in the rub mode. When the installation angle is less than 50 degrees, the controller 40 determines to perform the cleaning operation in the stamp mode. Thus, the ink adhering to the nozzle surface 11*a* can be appropriately removed.

[Modification]

In the above embodiment, the controller 40 determines which mode is performed, the rub mode or the stamp mode, in the cleaning operation on the basis of one determination condition. However, this is not the limitation. The controller 40 may determine the mode on the basis of a combination of determination conditions.

Figure 8:
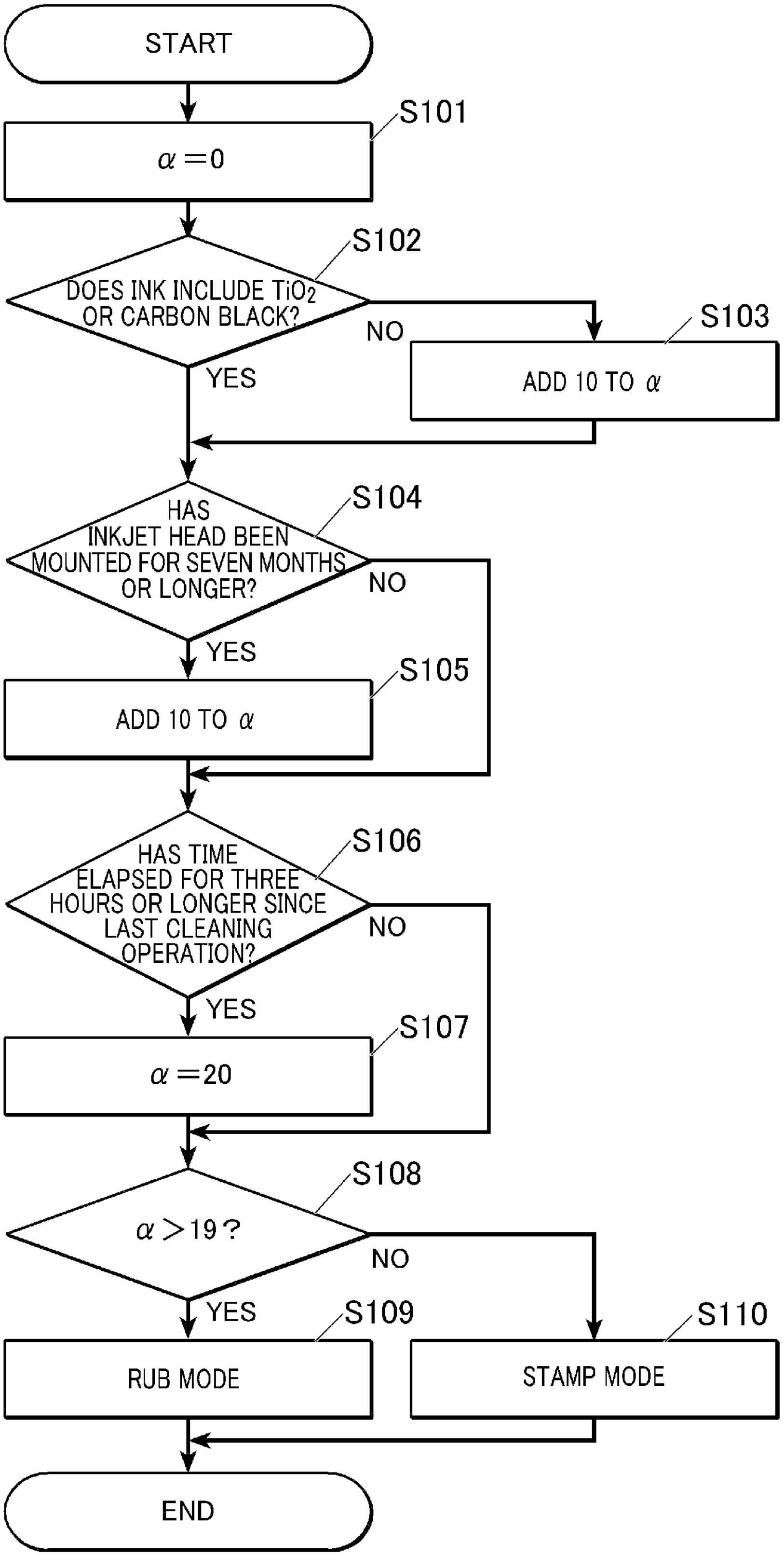
FIG. 8 is a flowchart showing a determination process by the controller to determine which mode of cleaning operation is performed based on multiple conditions.

The controller 40 determines the mode of the cleaning operation on the basis of a combination of conditions in accordance with the determination process. The determination process is described on the basis of the flowchart in FIG. 8.

In response to receiving an instruction to perform the cleaning operation, the controller 40 of the inkjet recording apparatus 1 resets a determination variable α to zero (Step S101). The determination variable α is for determining which mode is performed in the cleaning operation.

The controller 40 determines whether the components of ink ejected from the inkjet head 10 (cleaning target) include titanium oxide or carbon black (Step S102).

When determining that neither titanium oxide nor carbon black is included (Step S102: NO), the controller 40 adds 10 to the determination variable α and proceeds to step S104 (Step S103). When determining that ether titanium oxide or carbon black is included in the ink (Step S102: YES), the controller 40 proceeds to step S104.

The controller 40 determines whether the period of time during which the inkjet head 10 is mounted is seven months or longer (Step S104).

When determining that the period of time during which the inkjet head 10 is mounted is seven months or longer (Step S104: YES), the controller 40 adds 10 to the determination variable α and proceeds to step S106 (Step S105). When determining that the period of time during which the inkjet head 10 is mounted is shorter than seven months (Step S104: NO), the controller 40 proceeds to step S106.

The controller 40 then determines whether the time elapsed since the last cleaning operation is three hours or longer (Step S106).

When determining that the time elapsed since the last cleaning operation is three hours or longer (step S106: YES), the controller 40 substitutes 20 for the determination variable α and proceeds to step S108 (Step S107). When determining that the time elapsed since the last cleaning operation is shorter than three hours (Step S106: NO), the controller 40 proceeds to Step S108.

Lastly, the controller 40 determines whether the determination variable α is greater than 19 (Step S108). When determining that the determination variable α is greater than 19 (Step S108: YES), the controller 40 sends a signal to perform the cleaning operation on the inkjet head 10 in the rub mode (Step S109). When determining that the determination variable α is 19 or less (Step S108: NO), the controller 40 sends a signal to perform the cleaning operation on the inkjet head 10 in the stamp mode (Step S110).

As described above, in the present invention, the mode of the cleaning operation can be determined on the basis of a combination of determination conditions.

In the above description, the controller 40 determines the mode on the basis of the combination of the determination conditions 1, 2, 6 as an example. However, the combination of determination conditions from among the determination conditions 1 to 7 may be determined as desired. The value added to the determination variable α, the value to be substituted, and the value for determination in the respective steps may be increased or decreased as desired on the basis of the number of determination conditions included in the combination of determination conditions or on the basis of the weighting on the respective determination conditions included in the combination.

Examples

Next, the evaluation results of preferred configurations in the rub mode of the present invention are described with respect to the contact time and the relative sliding speed between the nozzle surface 11*a* and the cleaning surface 211*a*. Although the present invention is described in detail below on the basis of examples, the present invention is not limited to the examples.

(Create Samples)

Ink mists were intentionally adhered to the nozzle surfaces 11*a* of ten inkjet heads 10. Each of the ten inkjet heads 10 was then subjected to the following examination.

(Examination Details)

(1) The inkjet head 10 was mounted on AccurioJet KM-1 (manufactured by Konica Minolta, Inc.) as the inkjet recording apparatus 1.

(2) The cleaning unit 21 performed rubbing (wiping) on the inkjet had 10. The contact time between the nozzle surface 11*a* and the cleaning unit 21 was set to 2 seconds, 5 seconds, 10 seconds, 15 seconds, or 20 seconds. The relative sliding speed was set to 20 mm/second or 50 mm/second. The sliding distance was set to 6 mm in the respective cases.

(3) The amount of ink adhering to the nozzle surface 11*a* after rubbing (wiping) was visually checked and evaluated as "AA: no ink adhered", "BB: a little ink adhered", and "CC: ink adhered".

The result of the examination is shown in Table IV and Table V.

TABLE IV

| | SLIDING SPEED: 20 mm/s CONTACT TIME (S) | | | | |
|---|---|---|---|---|---|
| | 2 | 5 | 10 | 15 | 20 |
| EVALUATION RESULT | AA | AA | AA | BB | BB |

TABLE V

| | SLIDING SPEED: 50 mm/s CONTACT TIME (S) | | | | |
|---|---|---|---|---|---|
| | 2 | 5 | 10 | 15 | 20 |
| EVALUATION RESULT | AA | AA | BB | BB | BB |

(Evaluation)

The evaluation results of the cases where the sliding speed was 20 mm/s and the evaluation results of the cases where the sliding speed was 50 mm/s are compared to each other. The comparison shows that, when the sliding speed is the same, the shorter contact time between the nozzle surface 11*a* and the cleaning surface 211*a* results in the better ink cleaning capability.

This is because the cleaning surface 211*a* pulls out ink from the nozzles and stains the nozzle surface 11*a* when the cleaning member 211 is in contact with the nozzle surface 11*a* for a long time.

On the other hand, when the contact time is too short, the cleaning motion is not sufficiently performed. It is therefore preferable that the cleaning member 211 be in contact with the nozzle surface 11*a* at least for two seconds or longer.

When the sliding speed was 20 mm/s and the contact time was 10 seconds, the evaluation result was "AA". On the other hand, when the sliding speed was 50 mm/s and the contact time was 10 seconds, the evaluation result was "BB". This shows that, when the contact time is the same, the lower sliding speed between the nozzle surface 11*a* and the cleaning member 211 results in the better ink cleaning capability.

This is because the lower sliding speed allows the cleaning member 211 to sufficiently absorb the ink adhered to the nozzle surface 11*a*.

When the contact time is kept unchanged and the sliding speed is increased, the number of times of sliding increases and the water-repellent film is more likely to be damaged. It is therefore preferable that the sliding speed be slow.

[Other Configurations]

Figure 9:
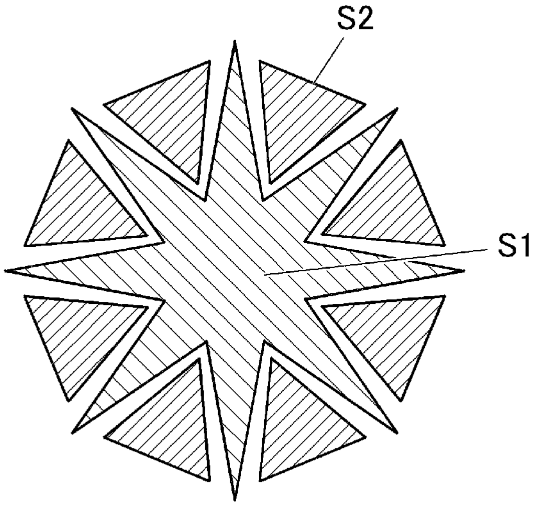
FIG. 9 shows a schematic cross section of split yarn.

When the cleaning member 211 is woven fabric, it is preferable that the yarn constituting the fabric be split yarn having a cross section as shown in FIG. 9. As shown in FIG. 9, the split yarn consists of a combination of two kinds of fibers S1, S2. The nylon fiber is used as the fiber S1, and the polyester fiber is used as the fiber S2. The split yarn consists of two kinds of fibers S1, S2 made of different materials and is subjected to the process of opening the fibers. As a result, the fibers are split into finer and distorted fibers.

The split yarn having a fine fiber structure enhances the liquid-absorbing capability of the cleaning member 211. The split yarn having distorted fibers also enhances the ink scraping capability of the cleaning surface 211*a* in the rub mode.

As shown in FIG. 1, it is preferable that the cleaning member 211 be configured such that the width W2 of the cleaning member 211 in the Y direction be wider than the width W1 of the nozzle plate 11 having the nozzle surface 11*a* in the Y direction. According to such a configuration, the motion of the cleaning member 211 can be simplified in both the rub and stamp modes. Specifically, in both modes, the nozzle surface 11*a* and the cleaning surface 211*a* are firstly brought into contact; in the rub mode, the sliding is performed from the contact position; in the stamp mode, the cleaning surface 211*a* and the nozzle surface 11*a* are kept still at the contact position.

Further, as shown in FIG. 1, it is preferable that the cleaning member 211 be configured such that the width W2 of the cleaning member 211 in the Y direction be wider than the total of (i) the width W1 of the nozzle plate 11 having the nozzle surface 11*a* in the Y direction and (ii) the sliding distance Ti in the Y direction in the rub mode. According to such a configuration, the whole nozzle surface 11*a* is always in contact with the cleaning member 211 in the sliding motion in the rub mode. This increases the scraping capability of the cleaning member 211.

When the cleaning member 211 is a woven fabric, it is preferable that a dry fabric be used for the cleaning operation. If the cleaning member 211 is wet, the adhesion between the nozzle surface 11*a* and the cleaning member 211 is likely to increase. Accordingly, the cleaning member 211 may pull out ink from the nozzles and may stain or damage the nozzle surface 11*a*.

Although the inkjet recording apparatus 1 includes the head cleaning apparatus 20 in the above description, this is not the limitation. The head cleaning apparatus 20 may be separate from the inkjet recording apparatus 1.

In the above description, the ROM 43 is used as a computer-readable medium that stores the programs of the present invention. However, the computer readable medium is not limited to this example.

As other computer-readable storage media, a nonvolatile memory, such as a flash memory, and a portable storage medium, such as a CD-ROM, may also be used.

Further, a carrier wave may be used as a medium to provide data of the programs of the present invention via a communication line.

The detailed configurations, structures, arrangements, control procedure, and orders of steps in the procedure of the inkjet recording apparatus 1 and the head cleaning apparatus 20 in the above embodiment can be appropriately modified without departing from the scope of the present invention.

What is claimed is:

1. A head cleaning apparatus comprising:

a cleaning unit that includes a cleaning member; and a hardware processor, wherein the head cleaning apparatus is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the hardware processor is configured to determine which mode is performed, the rub mode or the stamp mode, in the cleaning operation based on a predetermined condition, the predetermined condition being based on an amount of ink adhered to the nozzle surface, and wherein the determination unit is configured to determine that the cleaning operation is the stamp mode when the amount of ink is greater than a predetermined amount, and to determine that the cleaning operation is the rub mode when the amount of ink is equal to or less than the predetermined amount.

2. The head cleaning apparatus according to claim 1, wherein the hardware processor is configured to determine which mode is performed, based on the predetermined condition that includes an elapsed time since a time at which the last cleaning operation is performed.

3. The head cleaning apparatus according to claim 1, wherein the hardware processor is configured to determine which mode is performed, based on the predetermined condition that includes a component of ink ejected from a nozzle having an opening on the nozzle surface.

4. The head cleaning apparatus according to claim 1, wherein the hardware processor is configured to determine which mode is performed, based on the predetermined condition that includes whether a predetermined time has elapsed or not since purging.

5. The head cleaning apparatus according to claim 1, wherein the hardware processor is configured to determine which mode is performed, based on the predetermined condition that includes a statistic of a coverage in printing after the last cleaning operation.

6. The head cleaning apparatus according to claim 1, wherein the hardware processor is configured to determine which mode is performed, based on the predetermined condition that includes a total printing time since the last cleaning operation.

7. The head cleaning apparatus according to claim 1, wherein the hardware processor is configured to determine which mode is performed, based on the predetermined condition that includes a period of time during which the inkjet head is mounted.

8. The head cleaning apparatus according to claim 1, wherein in the rub mode, a time during which the cleaning member and the nozzle surface are in contact with each other is between two seconds and five seconds.

9. The head cleaning apparatus according to claim 1, wherein in the rub mode, the cleaning member and the nozzle surface are relatively slid on each other at a speed equal to or less than 20 mm/second.

10. The head cleaning apparatus according to claim 1, wherein the hardware processor is configured to determine which mode is performed, based on the predetermined condition that includes an installation angle of the inkjet head with respect to a horizontal plane when the inkjet head is installed.

11. The head cleaning apparatus according to claim 1, wherein the cleaning member is a woven fabric made of split yarn.

12. The head cleaning apparatus according to claim 1, wherein a width of the cleaning member in a sliding direction in the rub mode is wider than a width of the nozzle surface in the sliding direction.

13. The head cleaning apparatus according to claim 12, wherein the width of the cleaning member in the sliding direction in the rub mode is greater than a total of the width of the nozzle surface and a sliding distance in the sliding direction in the rub mode.

14. The head cleaning apparatus according to claim 1, wherein the cleaning member to be used in the cleaning operation is dry.

15. An inkjet recording apparatus comprising:

the inkjet head; and the head cleaning apparatus according to claim 1.

16. A head cleaning method for a head cleaning apparatus that includes a cleaning unit including a cleaning member and that is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the head cleaning method includes determining which mode is performed, the rub mode or the stamp mode, in the cleaning operation based on a predetermined condition, the predetermined condition being based on an amount of ink adhered to the nozzle surface, and wherein the cleaning operation is the stamp mode when the amount of ink is greater than a predetermined amount, and the cleaning operation is the rub mode when the amount of ink is equal to or less than the predetermined amount.

17. A non-transitory computer readable storage medium storing a program for a computer of a head cleaning apparatus that includes a cleaning unit including a cleaning member and that is configured to perform a cleaning operation of cleaning a nozzle surface of an inkjet head with the cleaning member, the nozzle surface having a water-repellent film, wherein the cleaning operation is performed either in a rub mode or a stamp mode, wherein in the rub mode, the cleaning member and the nozzle surface are brought into contact and relatively slid on each other, wherein in the stamp mode, the cleaning member and the nozzle surface are brought into contact and kept still, wherein the program causes the computer to determine which mode is performed, the rub mode or the stamp mode, in the cleaning operation based on a predetermined condition, the predetermined condition being based on an amount of ink adhered to the nozzle surface, and wherein the cleaning operation is the stamp mode when the amount of ink is greater than a predetermined amount, and the cleaning operation is the rub mode when the amount of ink is equal to or less than the predetermined amount.

* * * * *